WATSON SANFORD.
Improvement in Fire Place Ranges.
No. 4,526. Reissued Aug. 22, 1871.
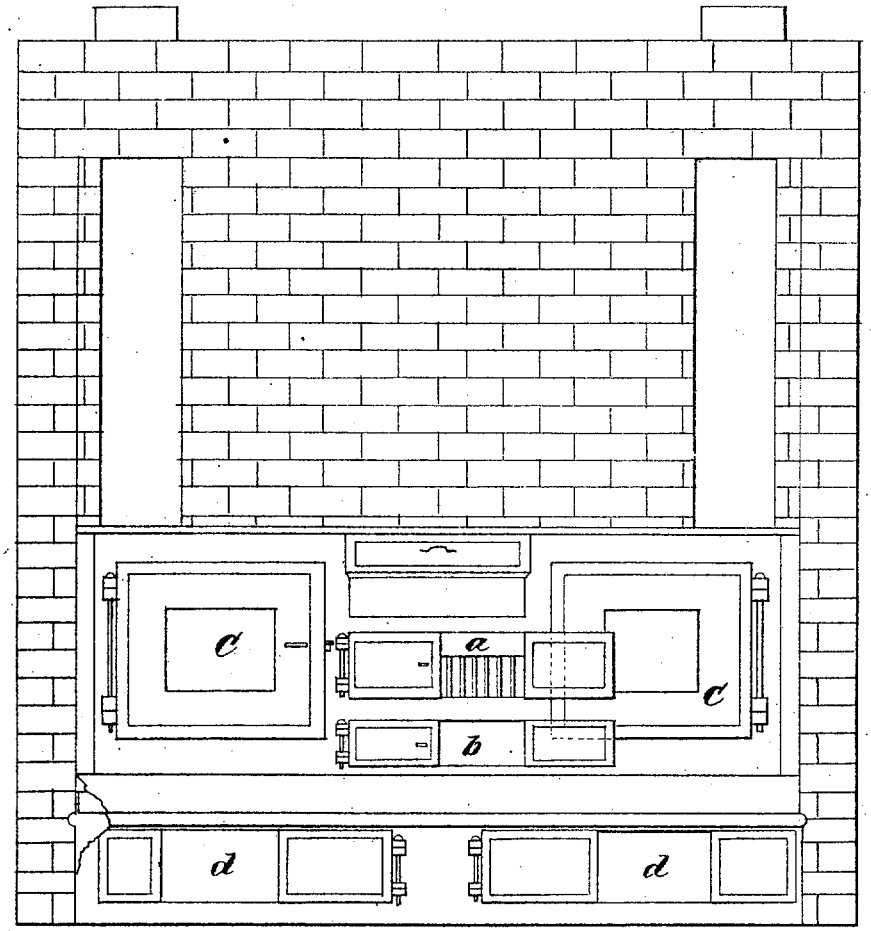
*Witnesses.*
A. B. Maclennan Jr.
James H. Hunter
*Inventor.*
Watson Sanford.
AM. PHOTO-LITHOGRAPHIC CO. N.Y. (OSBORNE'S PROCESS.)

UNITED STATES PATENT OFFICE.

WATSON SANFORD, OF BROOKLYN, NEW YORK.

IMPROVEMENT IN COOKING-RANGES.

Specification forming part of Letters Patent No. 115,644, dated June 6, 1871; reissue No. 4,526, dated August 22, 1871.

*To all whom it may concern:*

Be it known that I, WATSON SANFORD, of the city of Brooklyn, in the county of Kings and State of New York, have invented a new and useful Improvement in Fire-Place Ranges; and I do hereby declare that the following is a clear and exact description of the same.

My improvement consists in the application to a fire-place range of a warming-closet, said closet being arranged beneath the base of the range.

In the accompanying drawing, *a* is the fire-place; *b*, the ash-pit; *c c*, the ovens for roasting or baking; and *d*, a closet for holding cooked food, dishes, &c., situated directly beneath the ovens, flues thereof, and ash-pit.

This arrangement and location of warming-closet is superior to any other by reason of the heat being equalized therein by the action or effect of either the bottom flues of the main ovens, or of the ash-pit, or both combined.

The cooked food, dishes, &c., desired to be kept warm can be very conveniently run into or out of such closet by reason of its forming the base of the range and being on a level with the hearth. The range is also, by such arrangement of warming-closet, elevated, and thereby rendered more convenient for cooking and baking operations.

This warming-closet may, if desired, be made in more than one compartment, and extend more or less beneath the base of the range.

What I claim as new is—

A warming-closet in a fire-place range, when said closet is arranged directly beneath either the baking-ovens or ash-pit, or both, and at the base of the range, substantially as described.

WATSON SANFORD.

Witnesses:

A. B. MALCOMSON, Jr.,

JAMES H. HUNTER.